April 30, 1940.   C. S. ROBINSON   2,198,920
AERIAL CAMERA MOUNT
Filed Dec. 28, 1938

INVENTOR.
Cecil S. Robinson
BY Robert V. Morse
ATTORNEY.

Patented Apr. 30, 1940

2,198,920

UNITED STATES PATENT OFFICE 2,198,920

AERIAL CAMERA MOUNT

Cecil S. Robinson, Ithaca, N. Y.

Application December 28, 1938, Serial No. 248,087

6 Claims. (Cl. 95—12.5)

This invention relates to aerial camera mounts,—by which cameras such as used in aerial photography are supported in aircraft,—usually with the camera pointing downward and taking its pictures through an opening in the floor of the airplane. It is essential in such devices, particularly in aerial surveys, that the camera be so mounted that it can be tilted at moderate angles in any direction, to permit the operator to accurately follow lines on the ground regardless of the tilting of the airplane. The camera is a heavy object, usually weighing 50 to 75 pounds, and the quality of the photography is considerably affected by the ability of the operator to manually control and direct the camera with smoothness and precision, to offset the irregular movements of the airplane.

Aerial cameras are normally mounted in gimbal rings to afford universal movement, controlled by the observer's hand. The motion of the camera has been generally unrestrained except by forces of gravity and inertia, and while the camera is usually so delicately balanced that it will respond to a light touch, I have found from experience that this has certain disadvantages in practice when actually trying to follow objects on the ground under the conditions stated. To give steadiness to the human muscular and nervous reactions, I have found it desirable to introduce a gentle but progressive resistance of a resilient nature in the movements of the camera. This not only assists the operator to work more steadily, but also tends to dampen harmonic or swinging motions of the camera, which otherwise tend to make it swing by the desired point, or oscillate. In addition to these steadying devices, I have found it desirable to provide quickly adjustable means for setting various fore-and-aft angles of flight, as these change with various speeds and angles of incidence, thus making it easier for the operator to direct the camera without undue action at the gimbals.

It will be seen from the foregoing that the general objects of the invention are to improve the accuracy and ease of handling of aerial camera mounts so as to permit better quality photographs, and to save retaking. Various other objects will become apparent as the description proceeds.

Referring now to the drawing.

Similar numerals refer to similar parts throughout the various views.

Figure 1:
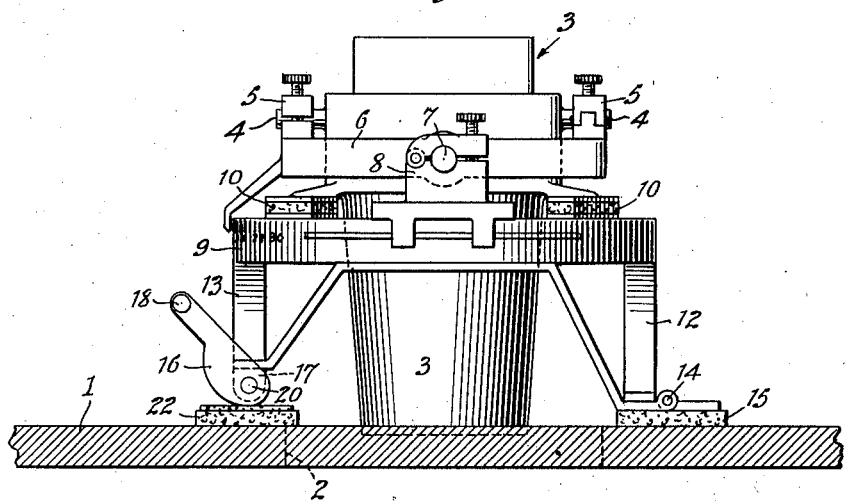
Fig. 1 is side view in elevation of an aerial camera as mounted in an airplane, showing the restraining or steadying cushions with the gimbal mount, and a fore and aft cam control.
Figure 2:
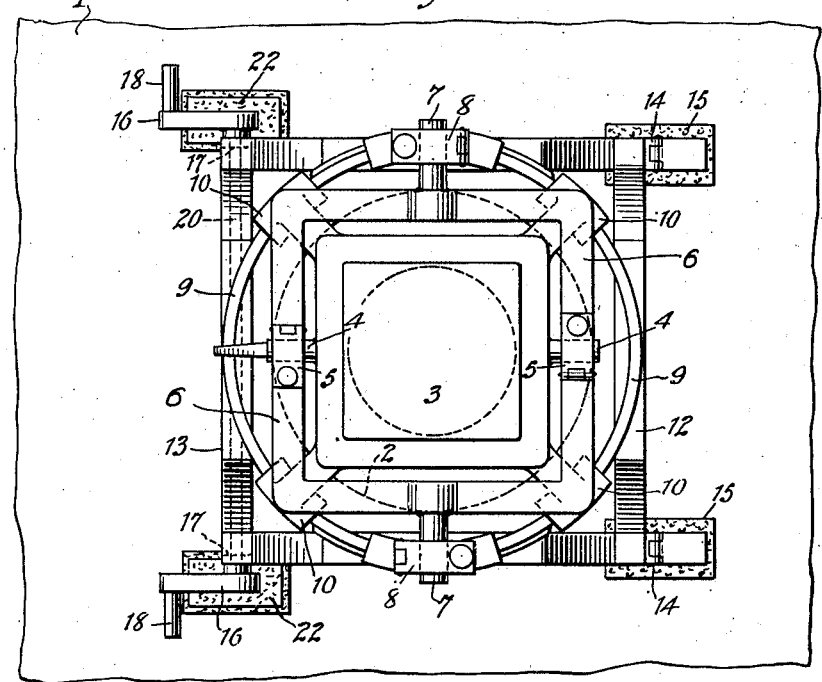
Fig. 2 is a plan view of the same.

The floor or fuselage of the airplane is indicated by the reference numeral 1, and this floor may be provided with an opening 2, through which photographs can be taken by means of the camera 3. Such aerial cameras are well known in the art, and the present invention is not concerned with their details, except as to the form of mounting in which the camera is supported.

The camera 3 is provided with a pair of trunnions 4—4 mounted in trunnion bearings 5—5 carried by the gimbal ring 6, which in turn is provided with another pair of trunnions 7—7 at right angles to the trunnions 4—4. The trunnions 7—7 are mounted in trunnion bearings 8—8 supported on the azimuth ring 9. The two sets of trunnions 4—4 and 7—7 being at right angles form a universal joint or mounting on which the camera 3 is capable of tilting in any direction, and rotation of this universal mount bodily on the azimuth ring 9 permits correction for crab or diagonal flight due to cross-winds. The foregoing numbered parts are commonly found in prior camera mounts.

In order to provide a gentle but progressive elastic resistance I place at various points between the camera 3 and the azimuth ring 9 elastic cushions 10, so that whatever direction the camera 3 is tilted, one or more of these cushions 10 will be compressed. The cushions 10 are preferably of sponge rubber or similar easily compressible material, so that the forces introduced are slight, but increase progressively in resistance as the tilt of the camera 3 relative to the ring 9 is increased. This gives a dampening and steadying effect with a slight resiliency which facilitates accurate manual control.

The azimuth ring 9 is supported on front legs 12, which are attached to hinges 14. These hinges 14 are preferably mounted on rubber cushions 15 to absorb shock and vibration. The rear legs 13 are provided with movable cams 16 which form the feet of the legs 13. These cams 16 are pivotally mounted in bearings 17 on the legs 13, so that they can be rotated by means of the cam handles 18. The cams 16 are preferably two in number and connected by the shaft 20 so that they rotate in unison. The cams may be given any suitable curvature to obtain the range of movement desired, and are retained by friction in whatever position set. One simple and effective means for so retaining them is to mount them on rubber pads 22, on the airplane floor, the pads 22 serving both as friction devices and vibration absorbers. Additional rubber feet or shock absorbers can be provided in the usual manner, if desired.

I am aware that adjustable devices have previously been proposed for offsetting the angle of incidence of the airplane. These have heretofore involved adjusting screws. The present improvement consists in using a direct cam action, which can be set at any desired angle practically instantaneously, while its irregular curvature permits it to be designed for any desired type of motion. The quick direct action of the cam feet is much easier to operate under flying conditions, and makes it possible to relieve the gimbal cushions 10 from continuous or excessive pressure. The ready change in fixed adjustment by the cam feet, together with the self-centering effect of the cushions 10, reduce the effort required in the operator to a minimum.

The elastic cushions 10 may be arranged as a number of separate cushions, or as a continuous ring or collar, provided that the resiliency or resistance is kept very light, so as not to seriously affect the free motion of the gimbal pivots 4—4 and 7—7. It is essential of course that the gimbals respond with great freedom to large angles of tilt in any direction. The cushions 10 should of course be evenly arranged so that the elastic resistance is substantially equal in every direction of tilt, to avoid unsymmetrical reactions.

While I have in the foregoing described a certain specific form by way of example, it will be understood that it is merely for purposes of illustration, to make clear the principles of the invention, which is not limited to the particular forms shown, but is susceptible to various modifications and adaptations in different installations, as will be apparent to those skilled in the art, without departing from the scope of the invention as stated in the following claims.

I claim:

1. In an aerial camera mount, the combination of a camera, a gimbal ring having two sets of pivots at right angles to form a universal joint, a base frame, means for turning said universal joint and camera bodily in azimuth, and elastic means for gently restraining the action of the universal joint, so as to interpose a slight resilient resistance to assist in manual stabilization.

2. In an aerial camera mount, the combination of a camera, a gimbal ring having two sets of pivots at right angles to form a universal joint, a base frame, cam means for tilting the base frame in a fore-and-aft direction, means for turning said universal joint and camera bodily in azimuth, and elastic means for gently restraining the action of the universal joint, so as to interpose a slight resilient resistance to assist in manual stabilization.

3. In an aerial camera mount, the combination of a camera, a universal gimbal mount for said camera, a base frame on which the camera and universal mount can be turned in azimuth, cam means attached to said base frame so that it can be tilted in a fore-and-aft direction, and frictional means for holding the cam means in whatever position it is set.

4. In an aerial camera mount, the combination of a camera, a gimbal ring having two sets of pivots at right angles to form a universal joint, a base frame, means for turning said universal joint and camera bodily in azimuth, and elastic means interposed between the camera and the base frame so as to slightly restrain resiliently the movement of the camera in the universal mounting, to assist in steadying the operator in manual operation.

5. In an aerial camera mount, the combination of a camera, a universal gimbal mount for said camera, means for adjusting the mount in azimuth, resilient means for slightly restraining movements of the camera in the gimbal mount, and frictionally held cam means for setting the mount at various angles of tilt in a fore-and-aft direction.

6. In an aerial camera mount, the combination of a universal gimbal mount adapted to hold a camera, a base frame on which the gimbal mount can be turned in azimuth, said base frame being hinged at one side, a pair of cams movably supporting the other side of the base frame, a handle for moving said cams, mechanical means connecting the cams so that they move in unison, and frictional means for holding the cams whereever set, whereby the base angle of the mount may be quickly adjusted.

CECIL S. ROBINSON.